3,692,529
PROCESS OF OILING
Loren J. Rychman, 406 Giles Place,
Albert Lea, Minn. 56007
No Drawing. Continuation of abandoned application Ser.
No. 615,891, Feb. 14, 1967. This application Sept. 8,
1970, Ser. No. 70,474
Int. Cl. C05 9/02; A23k 1/00
U.S. Cl. 99—2                                                5 Claims

ABSTRACT OF THE DISCLOSURE

There is provided a process for mixing finely divided solids with larger granular carriers to obtain a homogeneous free-flowing product which may be subsequently blended with a granular solid such as fertilizers to produce a composite fertilizer material.

---

This application is a continuation of S.N. 615,891 filed Feb. 14, 1967 and now abandoned.

This invention relates to the production of coated granular compositions, and more particularly to granular products coated with finely divided solids.

It is often desirable to obtain a homogeneous mixture of finely divided solids and a larger granular solid by blending. Unfortunately, even though such a composition can be uniformly blended, when shaken or jarred in handling or in normal transit the composition tends to segregate. This segregation is caused by the difference in particle size, density and flow properties of the large and small particles. A further disadvantage of such a mixture is the dusting which occurs when the mixture is poured, broadcast or spread in use. This dusting results in a substantial loss of the finely divided solids component of the composition.

Mixtures of finely divided solids and larger granular solids are used in a variety of applications such as fertilizers with trace elements added, livestock feed with trace minerals added, industrial cleaning compounds with additives, etc.

Various attempts to overcome these disadvantages have been made in the prior art, with mixed success. For example, the blended materials have been compressed with binders into pellets, but this is an expensive solution to the problem and for many applications such a tightly bound pellet is undesirable. Another example of a prior art solution is to slurry the solids in a liquid medium and to dispense them in this form. However, the slurries are difficult to mix and require almost constant agitation to maintain. This solution is not acceptable where it is desirable that the composition be in a dry form or where constant agitation is impractical.

U.S. Pat. No. 2,744,823 to Diamond suggests that homogeneous mixtures may be obtained by blending trace elements and salt with a liquid such as propylene glycol, mineral oil, and polyhydric alcohols. This mixture does in fact result in a homogeneous, nonsegregating product. However, the product of Diamond suffers from the disadvantage that it is not free-flowing. Furthermore, with an oil incorporated in the mixture of Diamond it is difficult to determine when mixing at which point a homogeneous mixture is obtained.

It is therefore an object of this invention to provide a composition of finely divided solids and granular solids that are homogeneously mixed, free-flowing and resistant to segregation, and a process for the production thereof.

A further object of this invention is to provide a process for mixing finely divided solids and granular material wherein it can be easily determined when a homogeneous mixture is obtained.

Still another object is to provide a fertilizer with trace elements mixed therein suitable for spreading or broadcasting without substantial dusting and loss of such trace elements. Still another object is to provide a homogeneous feed for livestock which contains trace minerals. Another object is to provide industrial mixtures of granular solids and finely divided additives which mixture may be stored, transported and poured without segregation of the mixture.

Broadly, this invention embraces treating solid particles of a metallic or nonmetallic substance or mixtures thereof, with an adhering oil, and a pigment or coloring compound. The oiled particles are usually blended with a diluent or carrier compound. This oiled pre-blended mixture may thereafter be blended with granular solids to provide a free-flowing, nonsegregating, homogeneous composition.

The oil contemplated by this invention may be any oil that will adhere to the metallic or nonmetallic particles. Especially useful are such oils as mineral oil, coal oil, castor oil, and vegetable oils such as soybean oil and corn oil. Other oils that may be used include propylene and ethylene glycol, glycerine, and sorbitol.

The pigment or coloring compound may be any of the known pigments or food and cosmetic coloring compounds such as powdered charcoal, carbon black, or colored minerals.

The diluent or carrier may be calcium carbonate, powdered corn cobs, silica, sand, clean soil, wood flour, bean meal, sugar, vermiculite, sulphur, sodium sulphate and calcium sulphate. The diluent or carrier performs two important functions. It serves to reduce the concentration of the finely divided solids per volume of the pre-blended composition, and hence allows a more accurate mixing of the composition in large industrial blending and weighing devices. The more important function of the diluent or carrier is to provide free-flowing properties to the mixtures which would otherwise be non-free flowing. It is not understood completely how the carrier acts or functions to provide these free-flowing properties, and while not being bound by theory, it is believed that the carrier absorbs and adsorbs the oil and subsequently releases the oil in an equilibrium relation between the carrier and the trace elements. This equilibrium release of oil renders free-flowing mixtures which would otherwise be tacky or sticky, and yet is sufficiently great to cause adherence by the trace elements.

Furthermore, when the mixture contains materials which are hydroscopic, the carriers absorb excess moisture and thereby prevent agglomeration. Of course some carriers are more efficient than others in the ability to absorb moisture, and when the mixture is quite hydroscopic and tends to readily agglomerate, good water absorbers such as vermiculite, powder corn cobs and calcium carbonate should be used as the carrier. It will be appreciated that many mixtures will not be hydroscopic, and indeed the granular material to be coated can provide the same function as the carrier, i.e. establish an equilibrium release of oil whereby the mixture remains free-flowing. In these cases the carrier is unnecessary. The need for a carrier can be readily determined simply by testing the flow properties of a mixture as herein described. If the mixture is not free-flowing, a carrier must be used.

In the practice of the process of this invention the finely divided solids such as trace elements having generally a particle size between 325 to 30 mesh, the oil, the pigment and carrier if required are added to a blender. The blender may be of any conventional design, but a ribbon blender is particularly useful. The blender may or may not be heated depending upon the particular oil being used and its viscosity at room temperature. The ingredients of the composition may be added to the blender serially or as a premix. Mixing is commenced and continued until the mixture has obtained a uniform color as a result of the pigment being homogeneously dispersed. The pigment therefore serves as an inexpensive and accurate indicator of a homogeneous mixture. This pre-blend or a part thereof is added to the granular material to be coated, or vice versa. Mixing is again commenced until a uniform color is obtained. The resulting mixture, if viewed on a microscopic scale will show granules uniformly coated with a layer of the finely divided particles of the pre-blend. The product will be free-flowing, non-dusting and resistant to segregation.

The amount of oil utilized may be varied widely depending upon the particular oil and solids being blended as well as the carrier when used. The proper amount of oil for any composition can easily be determined. A series of samples with varying oil percentages are mixed. The samples are agitated for a short period of time such as between 5 and 30 minutes. A visual check for differences in color at the top of the sample and at the middle of the sample and at the bottom of the sample will indicate if any segregation has occurred. The homogeneity of the sample can also be determined by microscopic examination or chemical analysis, but unless the homogeneity of the mixture is extremely critical, this is not necessary. Dust is easily determined by dropping a sample in a draft simulating 15-20 m.p.h. wind. The flow properties can readily be determined by merely pouring a sample, or by placing a sample on a flat surface and elliptically revolving the surface. From these simple tests the optimum amount of oil can readily be determined.

The amount of carrier used is not critical, but if an insufficient amount is used the premix will be substantially oily to the touch and the resulting blend with the granular material will not be free-flowing. An excess of carrier may be used without adversely affecting the mixture's properties. And, indeed, sometimes it is desired that an excess amount of carrier serve as a diluent.

Of course, the amounts of finely divided solids and granular material may be as desired.

It has also been found that the process may be performed by mixing the oil with the granular material and thereafter mixing the finely divided solids, carrier when required and pigment with the oiled granular material. For example, granular materials such as conventional fertilizers, are oiled according to the present invention, with or without the use of carriers, as required. The oiled fertilizers may then be mixed with trace elements at the point of application. This reverse process is especially suitable for adding trace elements to granular triple-superphosphate fertilizer.

It has also been found that the compositions of the present invention may be slurried in water, and that the resulting slurry resists separation. Generally speaking, these slurries require only occasional agitation to maintain the suspension whereas similar unoiled compositions require almost constant agitation to prevent separation of the slurry.

In many instances it is advantageous to discontinue the process after obtaining the pre-blend of finely divided solids, oil and pigment. The pre-blend may then be made available for use as desired. For example, the pre-blend may be mixed with a fertilizer at the point of application; hence the percentage of trace elements can be varied on adjacent fields as required by the farmer. Similarly, the pre-blend may be used when a carrier is included. With gravity feeds as used in industrial processes, the pre-blend containing granular carriers provides a free-flowing additive that will not plug or bridge the gravity feed units. Alternately, the carrier may be oiled and the trace elements or additions may be mixed therewith by the user.

The following examples are merely illustrative of some of the many applications possible with the present invention:

EXAMPLE 1

Conventional fertilizers commonly have zinc sulfate incorporated in granular form in a ratio of between 100:1 to 50:1 of zinc sulfate is easily available to plants. Zinc oxide is a much cheaper source of zinc than zinc sulfate, but because of the low availability to plants of the zinc oxide, it must be in finely divided form.

Test 1

A mixture of zinc oxide and a commercial fertilizer was made. After jarring a sample of the mixture for a period of 3 minutes to simulate transit, the sample was inspected. The granular fertilizer and zinc oxide had segregated, and an application of this mixture to a field would produce areas with a a great excess of zinc oxide and other areas with substantially no zinc oxide.

Test 2

A second composition was prepared in a blender according to the present invention. The composition containing 10 percent calcium carbonate, 13 percent carbon black, 6 percent mineral oil and 72 percent zinc oxide. The above percentages are by weight, and hereafter all percentages are expressed by weight unless otherwise indicated. The composition was mixed until a uniform color was obtained. To another blender was added a commercial fertilizer and the above pre-blend in a ratio of 50:1. This mixture was blended until a uniform color was obtained. The mixture was jarred for the same period as that of Test 1 and inspected. There was no perceivable difference in the color at various levels of the sample or any detectable segregation of a zinc oxide. An application of this fertilizer to a field would produce a uniform application of zinc oxide.

The composition of Test 1 was slurried in water. The composition rapidly settled. The slurry could be maintained only with substantially contant agitation.

The composition of Test 2 was slurried in water and the slurry required only occasional agitation to maintain the suspension. Hence the production of this invention is also practical for slurry applications of fertilizer without the necessity of constant agitation.

EXAMPLE 2

The above Example 1 was repeated except the zinc oxide was replaced in a series of tests with manganous oxide, manganese sulfate, copper sulfate, copper oxide, and iron sulfate. The fertilizer mixed with these trace elements was free-flowing and resistant to segregation.

Trace elements suitable for use in this process are zinc, manganese, copper, iron, cobalt, molybdenum, magnesium, boron and sulfur. These elements are usually in the form of salts, oxides, sulfates, carbonates or chlorides or may be in mineral form, for example such as borax.

EXAMPLE 3

A composition containing 6 percent mineral oil, 10 percent calcium carbonate, 13 percent carbon black and 72 percent iron sulfate was mixed until a uniform color was obtained. This premix was placed in a blender to which was added a conventional poultry feed. This composition was mixed until a uniform color was obtained. The resulting mixture was free-flowing and resistant to segregation. When the mixture of feed was placed in an open feeding trough the trace elements did not dust out and blow away.

EXAMPLE 4

The above Example 3 was repeate dexcept that the iron sulfate was replaced serially by trace minerals containing zinc, manganese, magnesium, copper, iron, cobalt, iodine, molybdenum, selenium and sulfur. These minerals are usually in the form of salts, oxides, carbonates, sulfates and chlorides. The resulting products are free-flowing and nonsegregated.

It is to be understood that the above examples merely indicate some of the applications of the present invention, and it is to be further understood that the trace elements in minerals may be used as mixtures with each other or that premixes of any number of the trace elements or minerals may be used.

It is to be also understood that the term "fertilizer" as used in this specification means any of the conventional high volume compositions commonly used by farmers for supplying plant growth materials to the soil, and which fertilizers are supplied in a solid granular form for field distribution with mechanical fertilizer spreaders or by hand.

I claim:

1. A process for coating finely divided solid trace elements on a granular solid selected from the group consisting of fertilizer and livestock feed whereby a homogeneous, free-flowing, non-segregating mixture is obtained, the steps of the process consisting essentially of mixing and adhering in oil, the said finely divided solid trace elements and a granular oil absorbing and oil adsorbing carrier selected from the group consisting of calcium carbonate, powdered corn cobs, silica, sand, clean soil, wood flour, bean meal, sugar, vermiculite, sulphur, sodium sulphate and calcium sulphate whereby the granular carrier is uniformly coated with the finely divided trace elements, mixing the so-coated carrier with the said granular solid whereby the granular solid has a uniform coating thereon of said carrier, which carrier also carries the said coating of said finely divided solid trace elements.

2. A mixture of finely divided solid trace elements and granular solids selected from the group consisting of fertilizer and livestock feed, said mixture having the properties of homogeneity, free-flowing and non-segregating, consisting essentially of the said granular solids coated with an oil absorbing and oil adsorbing carrier selected from the group consisting of calcium carbonate, powdered corn cobs, silica, clean soil, wood flour, bean meal, sugar, vermiculite, sulphur, sodium sulphate and calcium sulphate, said carrier being coated with the said finely divided solid trace elements, said carrier being held to the said granular solids by an adhering oil film, said finely divided solids being held to the said carrier by an adhering oil film.

3. A mixture according to claim 2 wherein a pigment is included in the mixture.

4. A process according to 1 wherein the resulting mixture is slurried in water whereby a settling resistant liquid fertilizer is obtained.

5. A process according to claim 1 wherein a pigment is included in the mixture, and said mixing is continued until a uniform color of the mixture is obtained.

References Cited
UNITED STATES PATENTS

| | | | |
|---|---|---|---|
| 2,234,484 | 3/1941 | Weinig | 117—100 X |
| 3,156,550 | 11/1964 | Bartels | 117—100 X |
| 3,353,949 | 11/1967 | Nau | 71—64 |
| 2,234,484 | 3/1941 | Weinig | 117—100 IX |
| 2,806,773 | 9/1957 | Pole | 71—64 |
| 3,052,560 | 9/1962 | Delaney | 117—100 IX |
| 3,156,550 | 11/1964 | Bartels | 117—100 SiX |
| 3,295,950 | 1/1967 | Blouin et al. | 117—100 OX |
| 3,321,298 | 5/1967 | Brdlack, Sr. et al. | 117—100 OX |
| 3,353,949 | 11/1967 | Nau | 71—64 |
| 3,423,199 | 1/1969 | Philen, Jr. et al. | 117—100 IX |

REUBEN FRIEDMAN, Primary Examiner

R. BARNES, Assistant Examiner

U.S. Cl. X.R.

71—1, 64 G; 99—2, 166; 117—100 A, 100 B